US012080267B2

(12) United States Patent
Suetsugu

(10) Patent No.: US 12,080,267 B2
(45) Date of Patent: Sep. 3, 2024

(54) VOICE AUGMENTATION DEVICE, PARTITION, MASK, MOUTH SHIELD, AND FACE SHIELD

(71) Applicant: Katsunori Suetsugu, Tokyo (JP)

(72) Inventor: Katsunori Suetsugu, Tokyo (JP)

( * ) Notice: Subject to any disclaimer, the term of this patent is extended or adjusted under 35 U.S.C. 154(b) by 64 days.

(21) Appl. No.: 17/830,446

(22) Filed: Jun. 2, 2022

(65) Prior Publication Data

US 2022/0399004 A1 Dec. 15, 2022

(30) Foreign Application Priority Data

Jun. 11, 2021 (JP) ................................. 2021-097740

(51) Int. Cl.
*A62B 18/08* (2006.01)
*A47F 10/00* (2006.01)
(Continued)

(52) U.S. Cl.
CPC .............. *G10K 11/18* (2013.01); *A47F 10/00* (2013.01); *G10K 11/004* (2013.01); *H04R 1/028* (2013.01);
(Continued)

(58) Field of Classification Search
CPC ........ G10K 11/08; G10K 11/00; G10K 11/18; G10K 11/22; G10K 11/004; H04R 1/028;
(Continued)

(56) References Cited

U.S. PATENT DOCUMENTS 170,672 A * 12/1875 Hooper .................. G10K 11/22
181/18
739,541 A * 9/1903 Greis .................. H04R 1/1008
181/22
(Continued)

FOREIGN PATENT DOCUMENTS

CN 111659048 A * 9/2020
GB 297854 A * 12/1922
(Continued)

OTHER PUBLICATIONS

Notice of Reasons for Refusal dated Sep. 22, 2021, issued in counterpart JP Patent Application No. 2021-097740, w/English translation (8 pages).

*Primary Examiner* — Edgardo San Martin
(74) *Attorney, Agent, or Firm* — WHDA, LLP

(57) ABSTRACT

A voice augmentation device disposed at a specific position with respect to a droplet suppressing member disposed between a speaker and a listener to suppress droplet generated from at least one of a mouth and nose of the speaker causes a base vibration input part to receive vibration from at least one of the droplet suppressing member and air between the droplet suppressing member and the base vibration input part, causes a mounting part to receive the vibration from the droplet suppressing member, causes a coupling part to receive the vibration from at least one of the droplet suppressing member and air between the droplet suppressing member and the coupling part, and causes a base vibration output part to transmit the vibration received
(Continued)

by the base vibration input part, the mounting part, and the coupling part to air on a side of the listener.

15 Claims, 11 Drawing Sheets

(51) Int. Cl.
*G10K 11/00* (2006.01)
*G10K 11/18* (2006.01)
*G10K 11/22* (2006.01)
*H04R 1/02* (2006.01)
*H04R 1/08* (2006.01)
*H04R 1/28* (2006.01)
*A47F 10/06* (2006.01)

(52) U.S. Cl.
CPC ........... *H04R 1/083* (2013.01); *H04R 1/2807* (2013.01); *A47F 2010/065* (2013.01); *H04R 2201/028* (2013.01)

(58) Field of Classification Search
CPC ........ H04R 1/083; H04R 1/2807; H04R 1/46; H04R 2201/028; A41D 13/11; A62B 18/08; A62B 18/02
See application file for complete search history.

(56) References Cited

U.S. PATENT DOCUMENTS 1,423,802 A * 7/1922 Hofstatter .............. G10K 11/08 181/177
1,501,720 A * 7/1924 Page ....................... G10K 11/08 369/160
1,730,227 A * 10/1929 McBride ................ A62B 18/08 55/DIG. 35
2,705,052 A * 3/1955 Workinger ............. A62B 18/08 128/201.19
3,124,130 A * 3/1964 Klinger .................. A62B 18/08 128/201.19
3,140,754 A * 7/1964 Motsinger .............. A62B 18/08 181/158
4,125,218 A * 11/1978 DeBoer .............. A47G 19/2227 181/177
4,602,245 A * 7/1986 Yang ...................... G10K 11/08 310/322
4,718,415 A * 1/1988 Bolnberger ............ H04R 1/083 379/430
4,901,356 A * 2/1990 Bauer .................... H04R 1/083 381/385
4,974,586 A * 12/1990 Wandel .................. A62B 18/10 128/206.28
5,875,775 A * 3/1999 Nur ........................ A62B 17/04 128/206.17
6,305,370 B1 * 10/2001 Rosert .................... A62B 18/08 128/201.19
6,997,178 B1 * 2/2006 Reynaud ................ A62B 18/08 128/201.19
9,361,862 B2 * 6/2016 Klemarewski ........... G10D 3/02
10,136,225 B2 * 11/2018 Register .................... H03F 3/19
10,297,238 B1 * 5/2019 Fugate ................... G10K 11/08
11,006,231 B1 5/2021 Parker
11,284,175 B1 * 3/2022 Riccio ..................... H04W 4/80
11,508,390 B1 * 11/2022 Ko ...................... G10L 21/0364
2014/0169612 A1 * 6/2014 Shih ....................... H04R 27/04 381/388
2016/0309702 A1 * 10/2016 Wynalda, Jr. ............. F01K 5/00
2018/0000173 A1 * 1/2018 Tsaur ..................... G10K 11/24
2022/0030340 A1 * 1/2022 Demske ................. H04R 1/025
2022/0130353 A1 * 4/2022 Namli ...................... G10D 3/02
2022/0238132 A1 * 7/2022 Smith ...................... H04R 1/08

FOREIGN PATENT DOCUMENTS

JP 2019-9662 A 1/2019
JP 2020-84388 A 6/2020
JP 3232280 U 6/2021
KR 860002078 Y1 * 8/1986
KR 102234853 B1 * 4/2021
KR 20230080160 A * 6/2023
WO WO-2021255404 A1 * 12/2021

* cited by examiner

VOICE AUGMENTATION DEVICE, PARTITION, MASK, MOUTH SHIELD, AND FACE SHIELD

CROSS REFERENCE TO RELATED APPLICATION

This application is based upon and claims the benefit of priority from Japanese Patent Application No. 2021-097740 filed Jun. 11, 2021, the entire contents of which are incorporated herein by reference.

BACKGROUND OF THE INVENTION

1. Technical Field

The present invention relates to a voice augmentation device that is disposed at a specific position with respect to a droplet suppressing member disposed between a speaker and a listener in order to suppress droplet generated from at least one of a mouth and nose of the speaker, to augment a voice of the speaker transmitted to the listener. The present invention relates to a partition, a mask, a mouth shield, and a face shield.

2. Description of the Related Art

Conventionally, a mask worn on a speaker is known as a droplet suppressing member disposed between the speaker and a listener in order to suppress droplet generated from at least one of a mouth and nose of the speaker (see, for example, JP 2020-084388 A).

SUMMARY OF THE INVENTION

However, the conventional mask makes it possible to suppress the droplet generated from at least one of the mouth and nose of the speaker, but the mask reduces the voice of the speaker transmitted to the listener, whereby the mask disadvantageously makes it difficult for the listener to hear the voice of the speaker.

Therefore, an object of the present invention is to provide a voice augmentation device, a partition, a mask, a mouth shield, and a face shield that can make it easy for the listener to hear the voice of the speaker.

A voice augmentation device of the present invention is a voice augmentation device disposed at a specific position with respect to a droplet suppressing member disposed between a speaker and a listener in order to suppress droplet generated from at least one of a mouth and nose of the speaker, to augment a voice of the speaker transmitted to the listener. The voice augmentation device includes a vibration input part receiving vibration from at least one of the droplet suppressing member and air between the droplet suppressing member and the vibration input part; and a vibration output part transmitting the vibration received by the vibration input part to air on a side of the listener with respect to the vibration output part.

With this configuration, the voice augmentation device of the present invention causes the vibration input part to receive the vibration of the voice of the speaker from at least one of the droplet suppressing member and the air between the droplet suppressing member and the vibration input part, and causes the vibration output pad to transmit the vibration of the voice of the speaker received by the vibration input part to the air on the side of the listener With respect to the vibration output part. Therefore, the voice of the speaker transmitted to the listener can be augmented, and as a result, the voice of the speaker can be easily heard by the listener.

The voice augmentation device of the present invention may further include a directivity imparting part imparting directivity to the voice output by the vibration output part to augment the voice transmitted to the listener.

With this configuration, the voice augmentation device of the present invention causes the directivity imparting part to impart the directivity to the voice output by the vibration output part to augment the voice transmitted to the listener, whereby the voice of the speaker can be more easily heard by the listener.

The voice augmentation device according to the present invention may further include a mounting part mounted on the droplet suppressing member, wherein the mounting part is mounted on the droplet suppressing member so that the voice augmentation device is disposed at the specific position with respect to the droplet suppressing member.

With this configuration, the mounting part is mounted on the droplet suppressing member so that the voice augmentation device of the present invention is disposed at the specific position with respect to the droplet suppressing member. Therefore, it is possible to facilitate the work of disposing the voice augmentation device with respect to the droplet suppressing member.

The voice augmentation device of the present invention may further include a coupling part coupling the vibration output part and the mounting part, wherein the coupling part has a variable length in a vertical direction when the voice augmentation device is disposed at the specific position with respect to the droplet suppressing member.

With this configuration, in the voice augmentation device of the present invention, the coupling part has a variable length in the vertical direction when the voice augmentation device is disposed at the specific position with respect to the droplet suppressing member. Therefore, the position of the vibration output part in the vertical direction when the voice augmentation device is disposed at the specific position with respect to the droplet suppressing member can be adjusted by the length of the coupling part to a position where the voice of the speaker output by the vibration output part is easily heard by the listener. As a result, the voice of the speaker can be more easily heard by the listener.

The voice augmentation device of the present invention may further include an additional input part receiving the vibration from air on the side of the speaker with respect to the droplet suppressing member, wherein the vibration output part transmits the vibration received by the vibration input part and the vibration received by the additional input part to air on the side of the listener with respect to the vibration output part.

With this configuration, the voice augmentation device of the present invention causes the vibration output part to transmit not only the vibration of the voice of the speaker received by the vibration input part but also the vibration of the voice of the speaker received by the additional input part from the air on the side of the speaker with respect to the droplet suppressing member to the air on the side of the listener with respect to the vibration output part.

Therefore, the voice of the speaker transmitted to the listener can be augmented, and as a result, the voice of the speaker can be more easily heard by the listener.

The voice augmentation device of the present invention may further include a loudspeaker augmenting the voice output by the vibration output part.

With this configuration, the voice augmentation device of the present invention causes the loudspeaker to augment the voice output by the vibration output part. Therefore, the voice of the speaker transmitted to the listener can be augmented, and as a result, the voice of the speaker can be more easily heard by the listener.

The voice augmentation device of the present invention may further include a resonating member disposed on a side of the speaker with respect to the droplet suppressing member when the voice augmentation device is disposed at the specific position with respect to the droplet suppressing member, to resonate a portion of the voice augmentation device on a side of the listener with respect to the droplet suppressing member, wherein the vibration output part is disposed on the side of the listener with respect to the droplet suppressing member when the voice augmentation device is disposed at the specific position with respect to the droplet suppressing member.

With this configuration, the voice augmentation device of the present invention causes the resonating member to receive the vibration of the voice of the speaker from the air on the side of the speaker with respect to the droplet suppressing member, and causes the resonating member to resonate the portion of the voice augmentation device on the side of the listener with respect to the droplet suppressing member. Therefore, it is possible to augment the vibration of the voice of the speaker that is transmitted by the vibration output part to the air on the side of the listener with respect to the vibration output part itself. Therefore, the voice augmentation device of the present invention can augment the voice of the speaker transmitted to the listener, and as a result, the voice of the speaker can be more easily heard by the listener.

A partition of the present invention includes the voice augmentation device; and the droplet suppressing member.

With this configuration, the partition of the present invention makes it possible for the listener to easily hear the voice of the speaker.

A mask of the present invention includes the voice augmentation device; and the droplet suppressing member.

With this configuration, the mask of the present invention makes it possible for the listener to easily hear the voice of the speaker.

A mouth shield of the present invention includes the voice augmentation device; and the droplet suppressing member.

With this configuration, the mouth shield of the present invention makes it possible for the listener to easily hear the voice of the speaker.

A face shield of the present invention includes the voice augmentation device; and the droplet suppressing member.

With this configuration, the face shield of the present invention makes it possible for the listener to easily hear the voice of the speaker.

The voice augmentation device, the partition, the mask, the mouth shield, and the face shield of the present invention make it possible for the listener to easily hear the voice of the speaker.

DETAILED DESCRIPTION

Hereinafter, embodiments of the present invention will be described with reference to the drawings.

First, the configuration of a voice augmentation device according to an embodiment of the present invention will be described.

Figure 1:
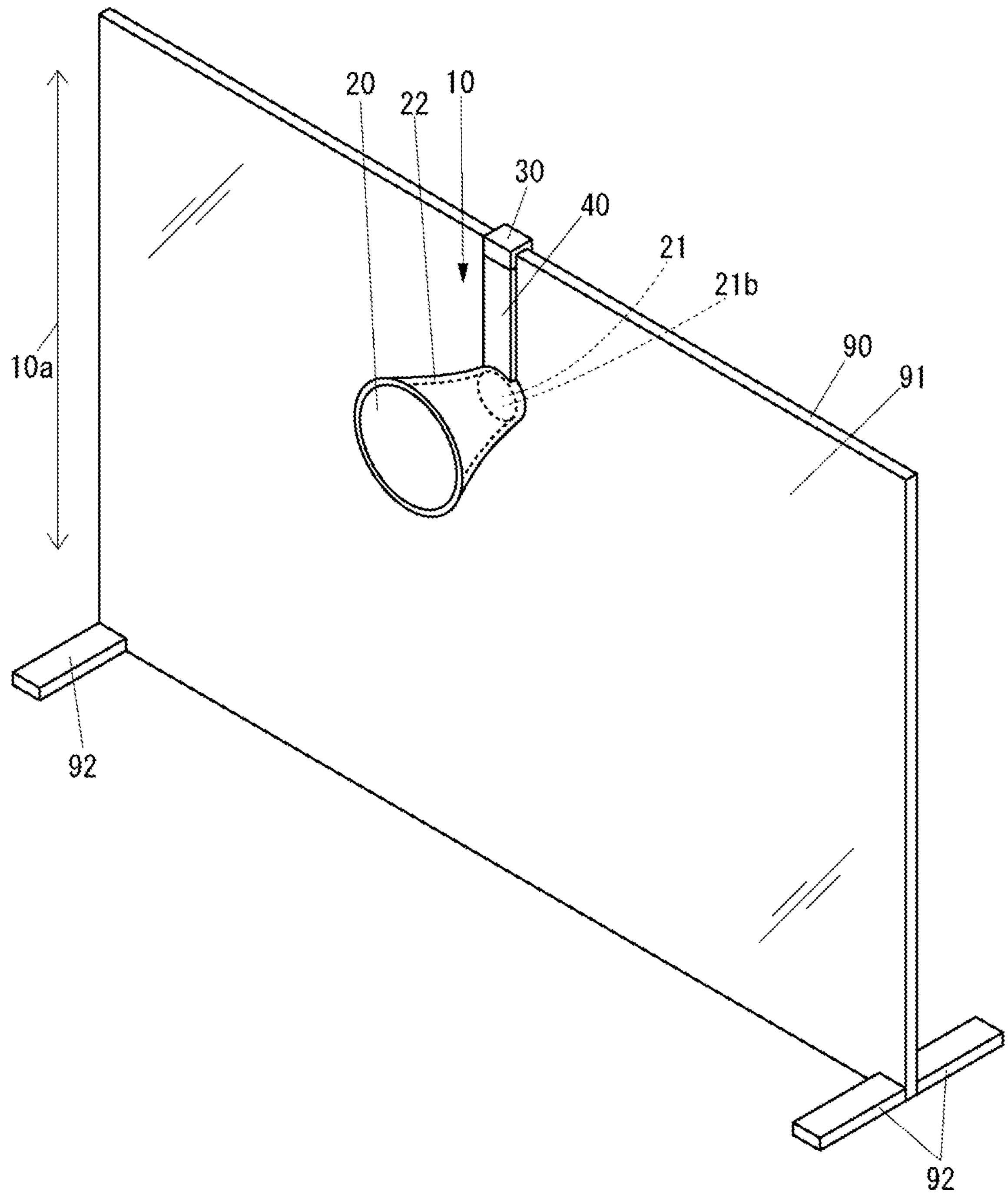
FIG. 1 is a perspective view of a partition in a state where a voice augmentation device according to an embodiment of the present invention is attached.
Figure 2:
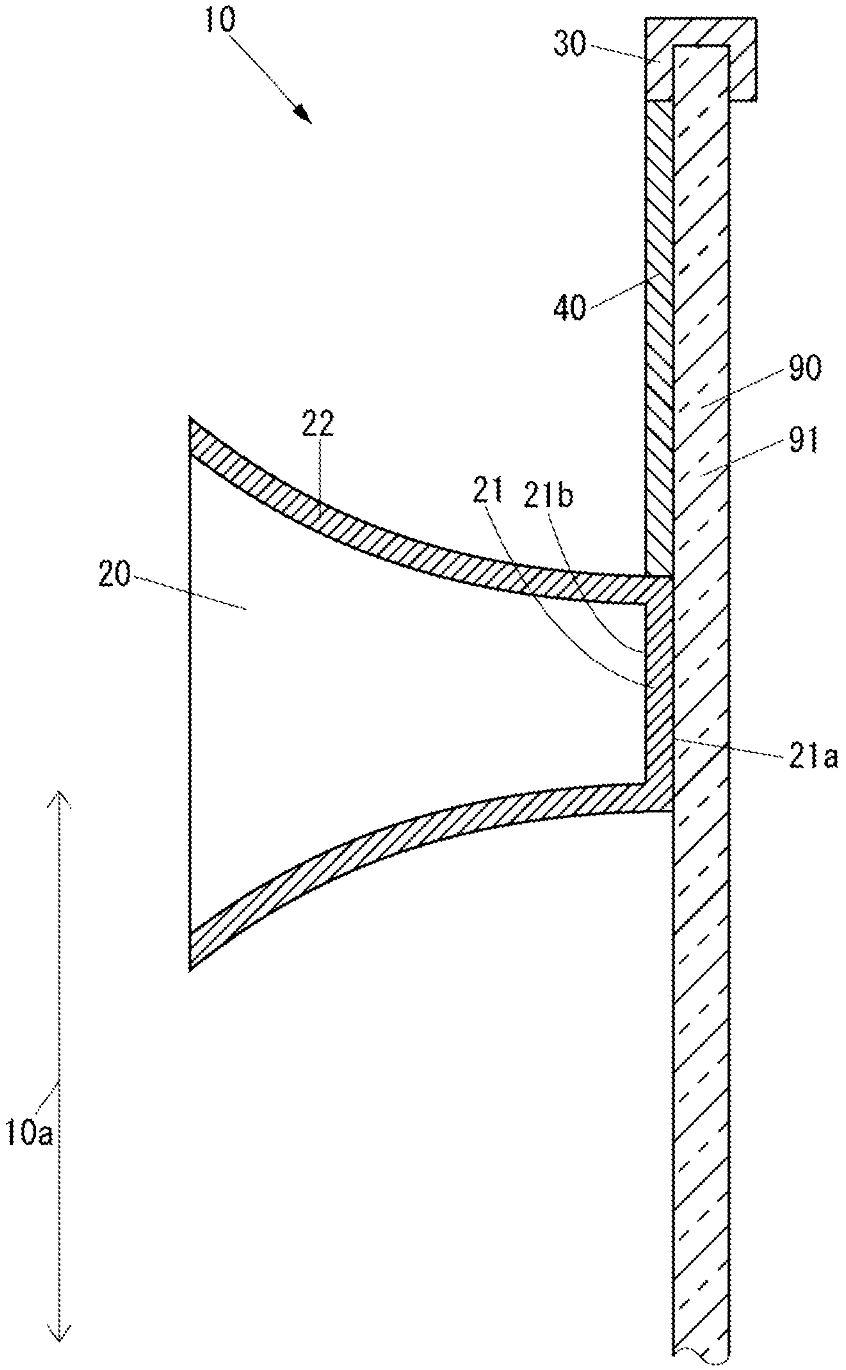
FIG. 2 is a side sectional view of a part of the partition in a state where the voice augmentation device shown in FIG. 1 is attached.

FIG. 1 is a perspective view of a partition 90 in a state where a voice augmentation device 10 according to the present embodiment is attached. FIG. 2 is a side sectional view of a part of the partition 90 in a state where the voice augmentation device 10 shown in FIG. 1 is attached.

As shown in FIGS. 1 and 2, the voice augmentation device 10 is attached to the partition 90 to augment the voice of a speaker transmitted to a listener. In FIG. 2, a space on the side of the speaker is located on a right side with respect to a droplet suppressing member 91, and a space on the side of the listener is located on a left side with respect to the droplet suppressing member 91.

The partition 90 includes the droplet suppressing member 91 disposed between the speaker and the listener in order to suppress droplet generated from at least one of the mouth and nose of the speaker, and a leg part 92 supporting the droplet suppressing member 91. The partition 90 is placed on a tabletop, for example. The droplet suppressing member 91 is formed of, for example, a transparent member such as an acrylic member.

The voice augmentation device 10 includes a main body 20, a mounting part 30 mounted on the droplet suppressing member 91 by being hooked on the droplet suppressing member 91, and a coupling part 40 coupling the main body 20 and the mounting part 30.

The mounting part 30 is mounted on the droplet suppressing member 91 in a state of being in contact with a portion of the droplet suppressing member 91 on which the mounting part 30 itself is mounted from above in a vertical direction. The mounting part 30 is in contact with the droplet suppressing member 91 and constitutes a vibration input part as a solid portion that receives vibration from the droplet suppressing member 91. The mounting part 30 may be formed of a material such as wood, metal, or plastic, for example. The voice augmentation device 10 is attached to the droplet suppressing member 91 by mounting the mounting part 30 on the droplet suppressing member 91.

The coupling part 40 is disposed on the side of the listener with respect to the droplet suppressing member 91 when the voice augmentation device 10 is attached to the droplet suppressing member 91. The coupling part 40 can be in contact with the droplet suppressing member 91, and constitutes a vibration input part as a solid portion that receives vibration from at least one of the droplet suppressing member 91 and air between the droplet suppressing member 91 and the coupling part 40 itself. The coupling part 40 may be formed of, for example, a material such as wood, metal, or plastic. The coupling part 40 may be formed integrally with at least one of the main body 20 and the mounting part 30 as one component.

The main body 20 is disposed on the side of the listener with respect to the droplet suppressing member 91 when the voice augmentation device 10 is attached to the droplet suppressing member 91. The main body 20 includes a base part 21 and a wall part 22 extending from the base part 21. The main body 20 may be formed of, for example, a material such as wood, metal, or plastic. When the voice augmentation device 10 is attached to the droplet suppressing, member 91, the position of the main body 20 in the vertical direction, that is, a direction indicated by an arrow **10*a* is lower than that of the mounting part 30**.

A portion **21*a* of the base part 21 on the side of the droplet suppressing member 91 (hereinafter, referred to as "base vibration input part") can be in contact with the droplet suppressing member 91, and constitutes a vibration input part as a solid portion that receives vibration from at least one of the droplet suppressing member 91 and air between the droplet suppressing member 91 and the base vibration input part 21*a*** itself.

A portion **21*b* of the base part 21 on the side of the listener (hereinafter, referred to as "base vibration output part") constitutes a vibration output part as a solid portion that transmits the vibration received by the base vibration input part 21*a*, the mounting part 30, and the coupling part 40 to the air on the side of the listener with respect to the base vibration output part 21*b*** itself.

The wall part 22 imparts directivity to the voice output by the base vibration output part **21*b* to constitute a directivity imparting part that augments the voice transmitted to the listener. That is, the wall part 22** constitutes an acoustic megaphone that acoustically augments the voice.

Next, the operation of the voice augmentation device 10 will be described.

When the speaker utters a voice, the vibration of the voice of the speaker is transmitted in the air, and then mainly received by the droplet suppressing, member 91 from the air on the side of the speaker with respect to the droplet suppressing member 91.

The vibration of the voice of the speaker received by the droplet suppressing member 91 is transmitted in the droplet suppressing member 91 and then received by the mounting part 30 from the droplet suppressing member 91. The vibration of the voice of the speaker received by the droplet suppressing member 91 may be transmitted in the droplet suppressing member 91, and then received by at least one of the base vibration input part **21*a* and the coupling part 40 from the droplet suppressing member 91. The vibration of the voice of the speaker received by the droplet suppressing member 91 may be transmitted in the droplet suppressing member 91, then received by the air on the side of the listener with respect to the droplet suppressing member 91 from the droplet suppressing member 91. The vibration of the voice of the speaker received by the air on the side of the listener with respect to the droplet suppressing member 91 may be transmitted in the air on the side of the listener with respect to the droplet suppressing member 91. The vibration of the voice of the speaker transmitted in the air on the side of the listener with respect to the droplet suppressing member 91 may be received by the base vibration input part 21*a* from the air between the droplet suppressing member 91 and the base vibration input part 21*a*. The vibration of the voice of the speaker transmitted in the air on the side of the listener with respect to the droplet suppressing member 91 may be received by the coupling part 40 from the air between the droplet suppressing member 91 and the coupling part 40**.

The vibration of the voice of the speaker received by the base vibration input part **21*a*, the mounting part 30, and the coupling part 40 is transmitted in the voice augmentation device 10, that is, in a solid, and then received by the air on the side of the listener with respect to the base vibration output part 21*b* from the base vibration output part 21*b***.

To the vibration of the voice of the speaker received by the air on the side of the listener with respect to the base vibration output part **21*b*, the directivity is imparted by the wall part 22**. The vibration of the voice of the speaker to which the directivity has been imparted is transmitted in the air, and then received by the listener.

As described above, the voice augmentation device 10 causes the base vibration input part **21*a* to receive the vibration of the voice of the speaker from at least one of the droplet suppressing member 91 and the air between the droplet suppressing member 91 and the base vibration input part 21*a*, causes the mounting part 30 to receive the vibration of the voice of the speaker from the droplet suppressing member 91, and causes the coupling part 40 to receive the vibration of the voice of the speaker from at least one of the droplet suppressing member 91 and the air between the droplet suppressing member 91 and the coupling part 40. Then, the voice augmentation device 10 causes the base vibration output part 21*b* to transmit the vibration of the voice of the speaker received by the base vibration input part 21*a*, the mounting part 30, and the coupling part 40 to the air on the side of the listener with respect to the base vibration output part 21*b***. Therefore, the voice of the speaker transmitted to the listener can be augmented, and as a result, the voice of the speaker can be easily heard by the listener.

The voice augmentation device 10 causes the wall part 22 to impart the directivity to the voice output by the base vibration output part 21*b* to augment the voice transmitted to the listener, whereby the voice of the speaker can be more easily heard by the listener.

Figure 3A:
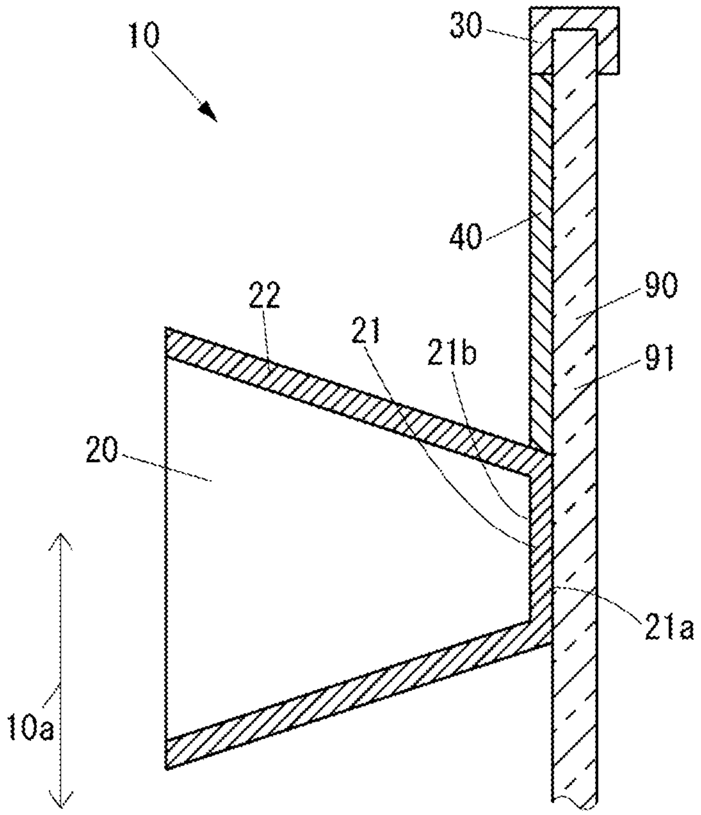
FIG. 3A is a side sectional view of a part of the partition in a state where a voice augmentation device as an example different from the example shown in FIG. 2 is attached.
Figure 3B:
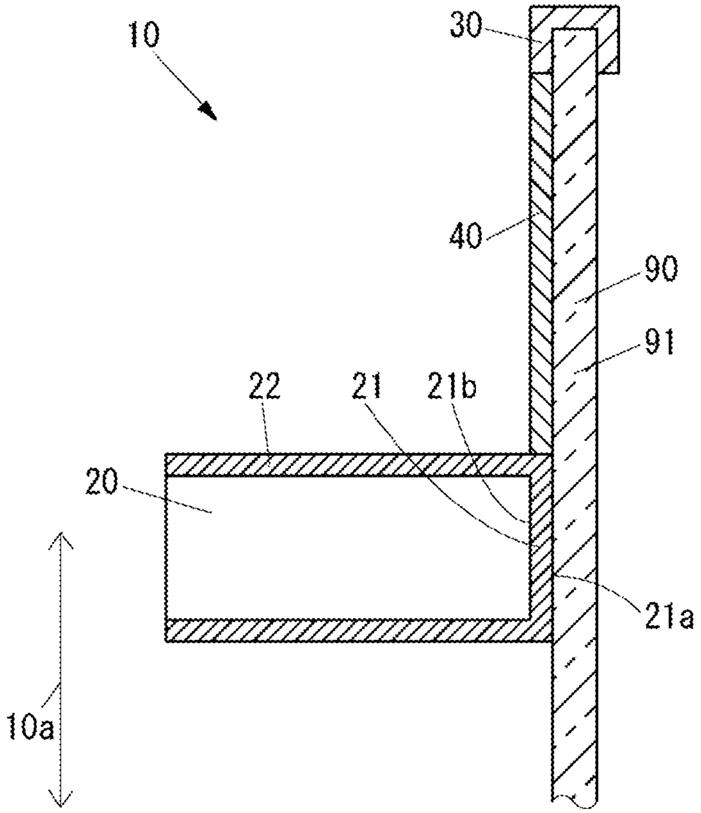
FIG. 3B is a side sectional view of a part of the partition in a state where a voice augmentation device as an example different from the examples shown in FIGS. 2 and 3A is attached.

FIG. 3A is a side sectional view of a part of the partition 90 in a state where the voice augmentation device 10 as an example different from the example shown in FIG. 2 is attached. FIG. 3B is a side sectional view of a part of the partition 90 in a state where the voice augmentation device 10 as an example different from the examples shown in FIGS. 2 and 3A is attached.

The shape of the wall part 22 is a horn shape as shown in FIG. 2 in the present embodiment, but may be a shape other than the horn shape. For example, the shape of the wall part 22 may be a cone shape as shown in FIG. 3A or may be a cylindrical shape as shown in FIG. 3B.

The shape of the main body 20 when observed from the front on the side of the listener is a circular shape in the present embodiment, but may be a shape other than the circular shape, such as a quadrangle.

The voice augmentation device 10 includes the wall part 22 in the present embodiment, but may not include the wall part 22.

The mounting part 30 is mounted on the droplet suppressing member 91 so that the voice augmentation device 10 is disposed at a specific position with respect to the droplet suppressing member 91. Therefore, it is possible to facilitate the work of disposing the voice augmentation device 10 with respect to the droplet suppressing member 91.

Figure 4:
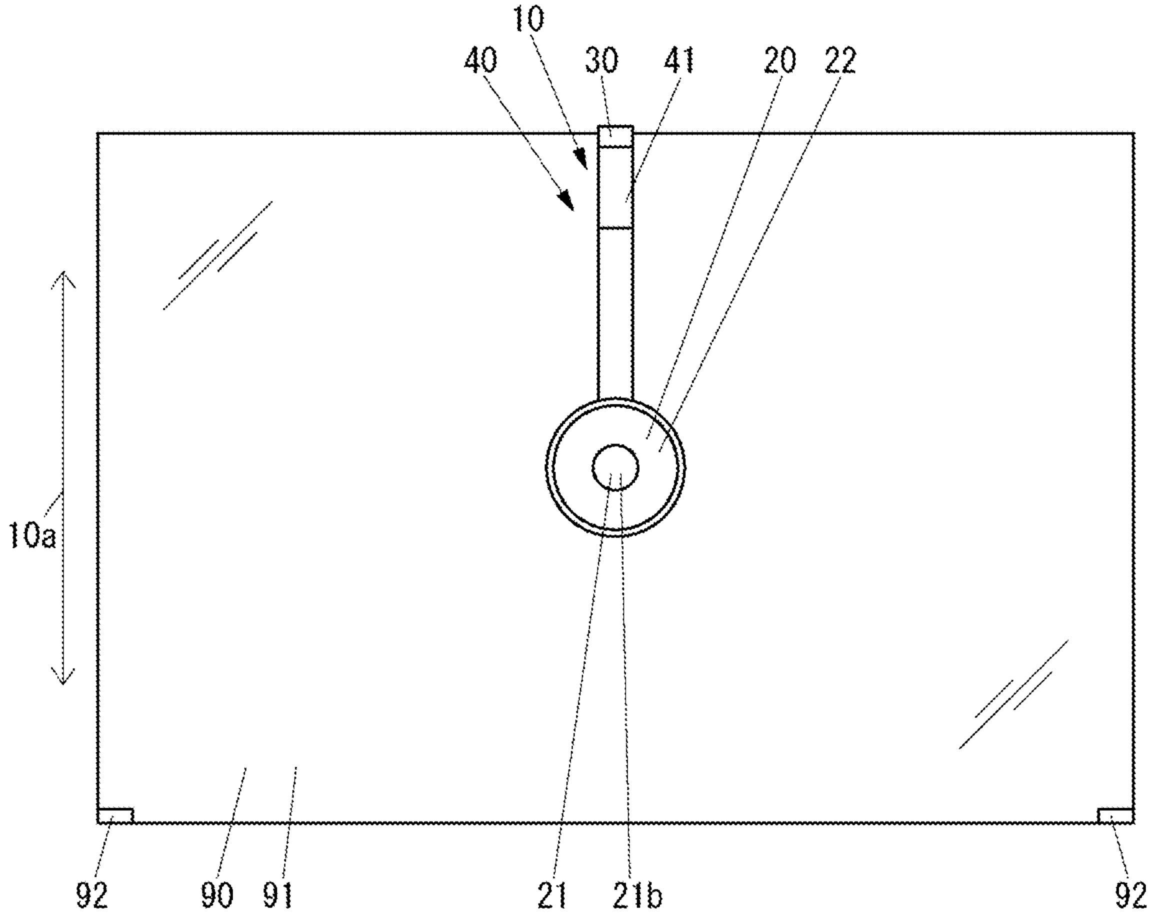
FIG. 4 is a front view of the partition in a state where the voice augmentation device including an extended coupling part and shown in FIG. 1 is attached.

FIG. 4 is a front view of the partition 90 in a state where the voice augmentation device 10 including an extended coupling part 40 is attached.

The coupling part 40 may have a variable length in a vertical direction, that is, a direction indicated by an arrow 10*a* when the voice augmentation device 10 is attached to the droplet suppressing member 91. As a method in which the length of the coupling part 40 in the direction indicated by the arrow 10*a* is variable, various methods can be adopted. For example, as shown in FIG. 4, the length of the coupling part 40 in the direction indicated by the arrow 10*a* may be able to be extended by adding an extension member 41 to the coupling part 40. In the voice augmentation device 10, when the length of the coupling part 40 in the direction indicated by the arrow 10*a* is variable, the position of the base vibration output part 21*b* in the direction indicated by the arrow 10*a* can be adjusted by the length of the coupling part 40 in the direction indicated by the arrow 10*a* to a position where the voice of the speaker output by the base vibration output part 21*b* is easily heard by the listener. As a result, the voice of the speaker can be more easily heard by the listener.

Figure 5A:
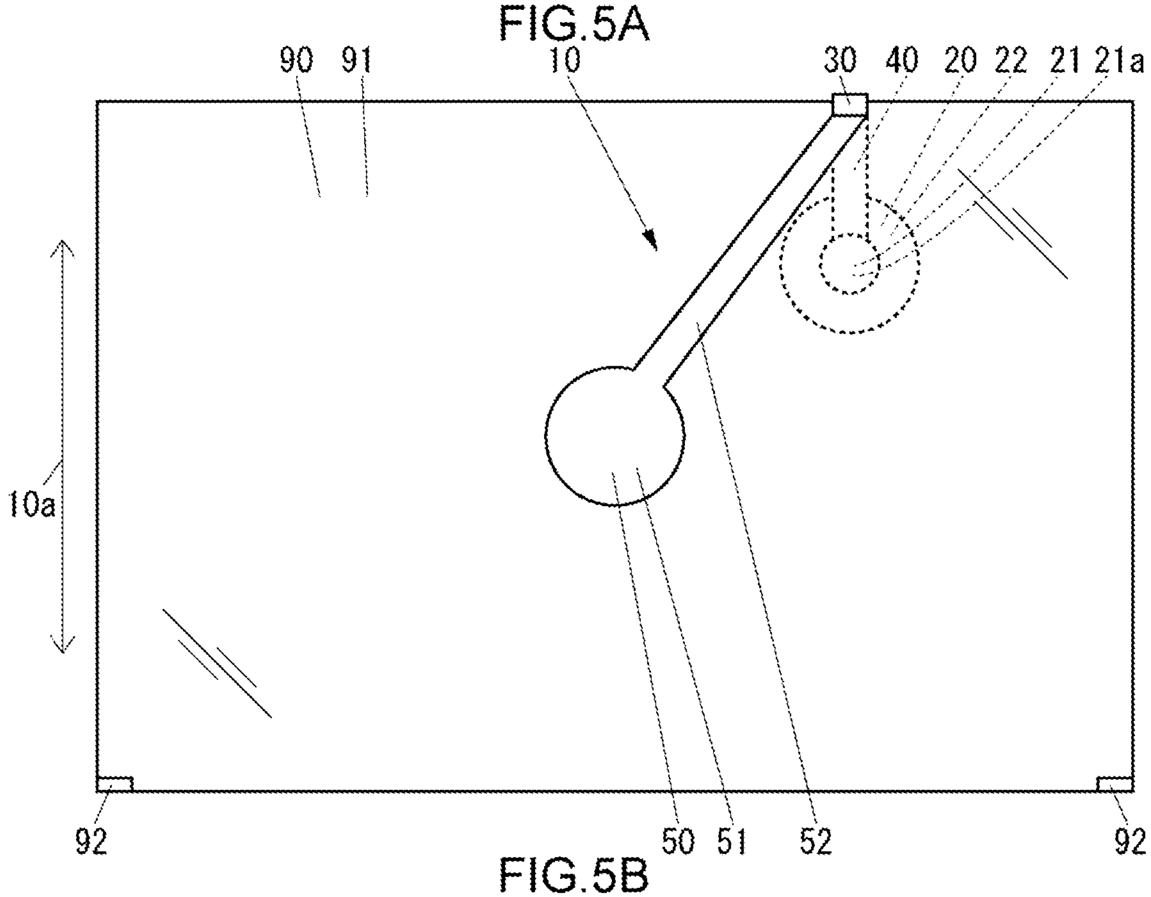
FIG. 5A is a rear view of the partition in a state where the voice augmentation device including an additional input part and shown in FIG. 1 is attached.
Figure 5B:
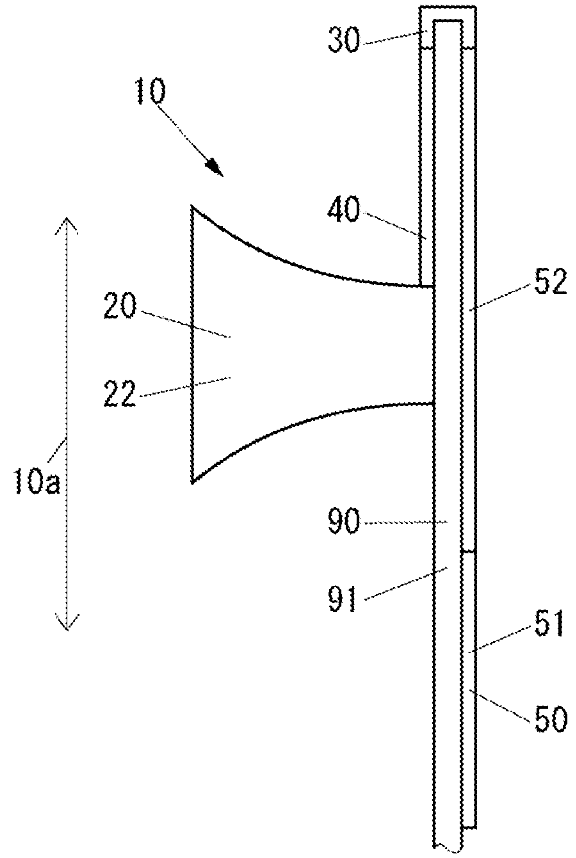
FIG. 5B is a side view of a part of the partition in a state where the voice augmentation device shown in FIG. 5A is attached.

FIG. 5A is a rear view of the partition 90 in a state where the voice augmentation device 10 including an additional input part 50 is attached. FIG. 5B is a side view of a part of the partition 90 in a state where the voice augmentation device 10 shown in FIG. 5A is attached.

As shown in FIGS. 5A and 5B, the voice augmentation device 10 may include an additional input part 50 as a solid portion that receives the vibration from the air on the side of the speaker with respect to the droplet suppressing member 91. The additional input part 50 is disposed on a side opposite to the side of the main body 20 with respect to the droplet suppressing member 91 when the voice augmentation device 10 is attached to the droplet suppressing member 91. That is, the additional input part 50 is disposed on the side of the speaker with respect to the droplet suppressing member 91. The additional input part 50 includes a main input part 51 for mainly receiving vibration from the air on the side of the speaker with respect to the droplet suppressing member 91, and an auxiliary input part 52 for coupling the main input part 51 to the mounting part 30 and receiving vibration from the air on the side of the speaker with respect to the droplet suppressing member 91. The additional input part 50 may be formed of, for example, a material such as wood, metal, or plastic. The additional input part 50 may be formed integrally with the mounting part 30 as one component. The additional input part 50 may be attachable to and detachable from the mounting part 30. The main input part 51 is preferably disposed at the front of the mouth of the speaker. When the voice augmentation device 10 includes the additional input part 50, not only the vibration of the voice of the speaker received by the base vibration input part 21*a*, the Mounting part 30, and the coupling part 40 but also the vibration of the voice of the speaker received by the additional input part 50 from the air on the side of the speaker with respect to the droplet suppressing member 91 are transmitted to the air on the side of the listener with respect to the base vibration output part 21*b* by the base vibration output part 21*b*. Therefore, the voice of the speaker transmitted to the listener can be augmented, and as a result, the voice of the speaker can be more easily heard by the listener.

Figure 6:
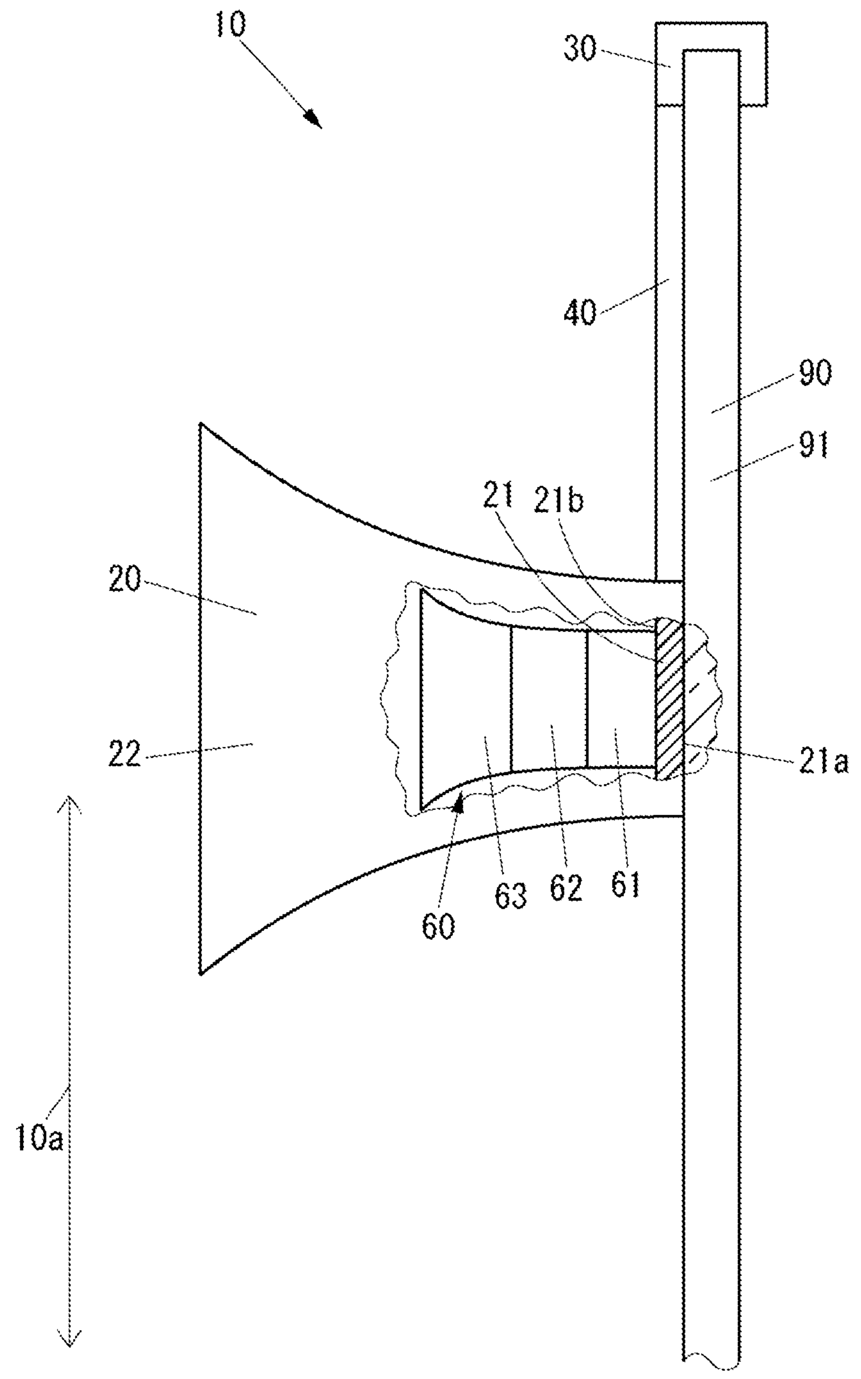
FIG. 6 is a partial sectional view of a part of the partition, which is observed from a side surface side, in a state where the voice augmentation device including a loudspeaker and shown in FIG. 1 is attached.

FIG. 6 is a partial sectional view of a part of the partition 90, which is observed from a side surface side, in a state where the voice augmentation device 10 including a loudspeaker 60 is attached.

As shown in FIG. 6, the voice augmentation device 10 may include a loudspeaker 60 augmenting the voice output by the base vibration output part 21*b*. The loudspeaker 60 includes a microphone 61 to which the voice output by the base vibration output part 21*b* is input, an amplifier 62 amplifying an output signal of the microphone 61, a speaker 63 outputting a voice according to an output signal of the amplifier 62, and a battery (not illustrated) as a power source of the microphone 61, the amplifier 62, and the speaker 63. The loudspeaker 60 may be pasted to the base vibration output part 21*b* with an adhesive such as a double-sided tape. When the voice augmentation device 10 includes the loudspeaker 60, the voice output by the base vibration output part 21*b* is augmented by the loudspeaker 60. Therefore, the voice of the speaker transmitted to the listener can be augmented and as a result, the voice of the speaker can be more easily heard by the listener.

Figure 7:
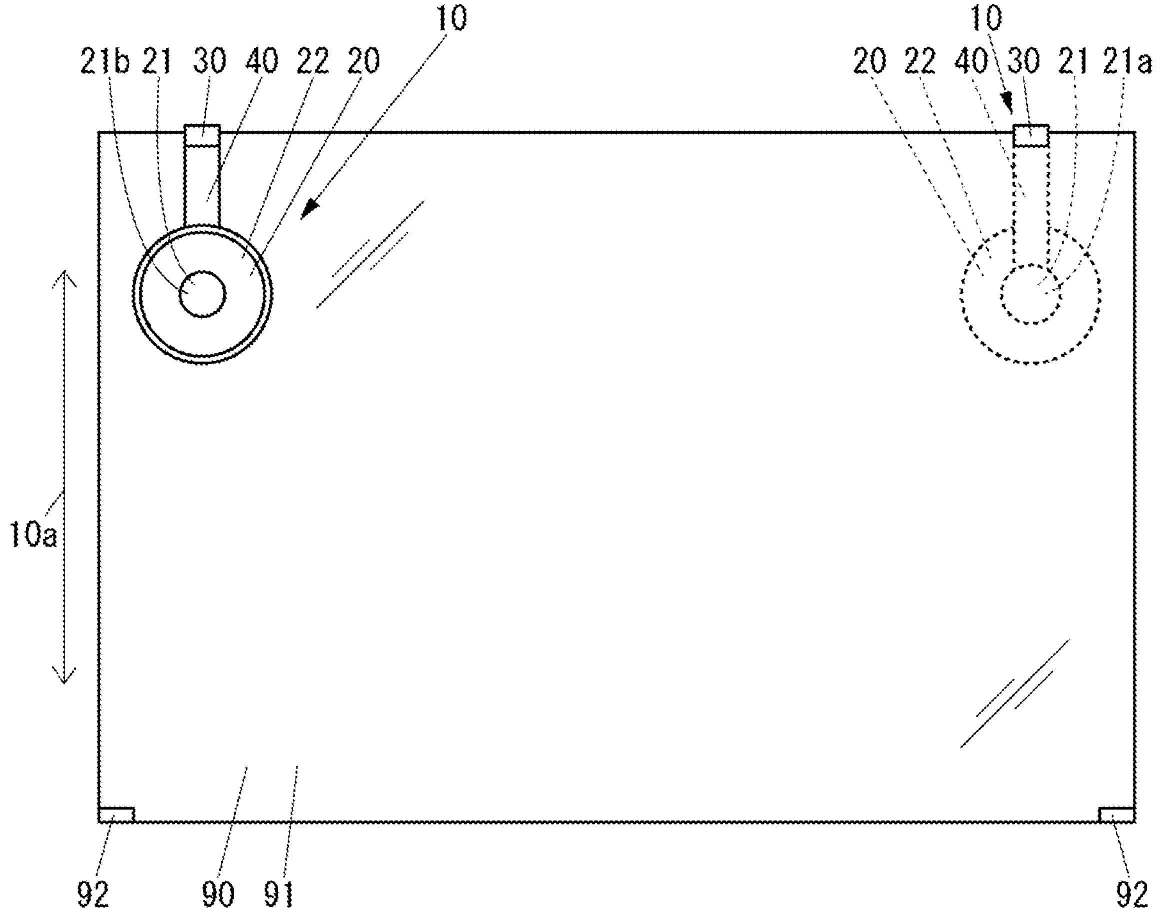
FIG. 7 is a front view of the partition in a state where the voice augmentation device shown in FIG. 1 for a listener on each side of both surfaces of a droplet suppressing member is attached.

FIG. 7 is a front view of the partition 90 in a state where the voice augmentation device 10 far the listener on each side of both surfaces of the droplet suppressing member 91 is attached.

The voice augmentation device 10 is provided only for the listener on one surface side of the droplet suppressing member 91 in FIG. 1. However, as shown in FIG. 7, the voice augmentation device 10 may be additionally provided for the listener on the other surface side of the droplet suppressing member 91.

As shown in FIG. 7, when the voice augmentation device 10 for the listener on each side of both surfaces of the droplet suppressing member 91 is provided the voice augmentation devices 10 are preferably disposed in a form other than a form in which base parts 21 completely face each other with the droplet suppressing member 91 therebetween in order to reduce the possibility of adversely affecting each other in the transmission of the voice. That is, the base parts 21 of the voice augmentation devices 10 are preferably disposed such that the positions of the base parts 21 in the extending direction of the droplet suppressing member 91 are shifted from each other.

Figure 8A:
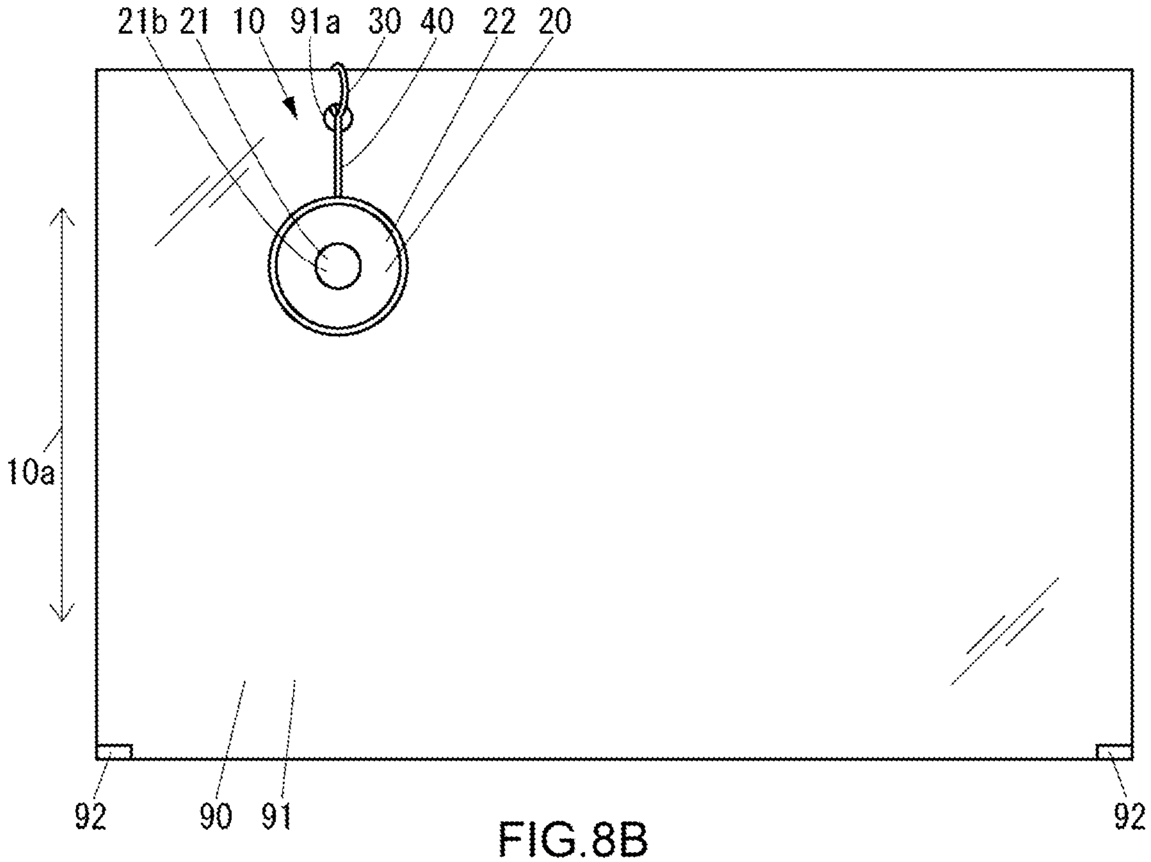
FIG. 8A is a front view of the partition in a state where the voice augmentation device according to an embodiment of the present invention is attached, in which a mounting part and a coupling part are formed of a string-like member

FIG. 8A is a front view of the partition 90 in a state where the voice augmentation device 10 in which the mounting part 30 and the coupling part 40 are formed of a string-like member is attached, FIG. SB is a front view of the partition 90 in a state where the two voice augmentation devices 10 in which the mounting part 30 and the coupling part 40 are formed of a string-like member are attached.

The coupling part 40 is formed of a plate-like member in FIG. 1, but may be formed of a string-like member. Similarly, the mounting part 30 may be formed of a string-like member. For example, the mounting part 30 and the coupling part 40 may be formed of a string-like member as shown in FIGS. 8A and 8B.

In the example shown in FIG. 8A, the string-like mounting part 30 is caused to partially pass through a hole 91*a* formed in the droplet suppressing member 91 and then fastened to the droplet suppressing member 91 in a ring shape. The mounting part 30 shown in FIG. 8A is mounted on the droplet suppressing member 91 in a state of being in contact with a portion of the droplet suppressing member 91 on which the mounting part 30 itself is mounted from above in a vertical direction.

Figure 8B:
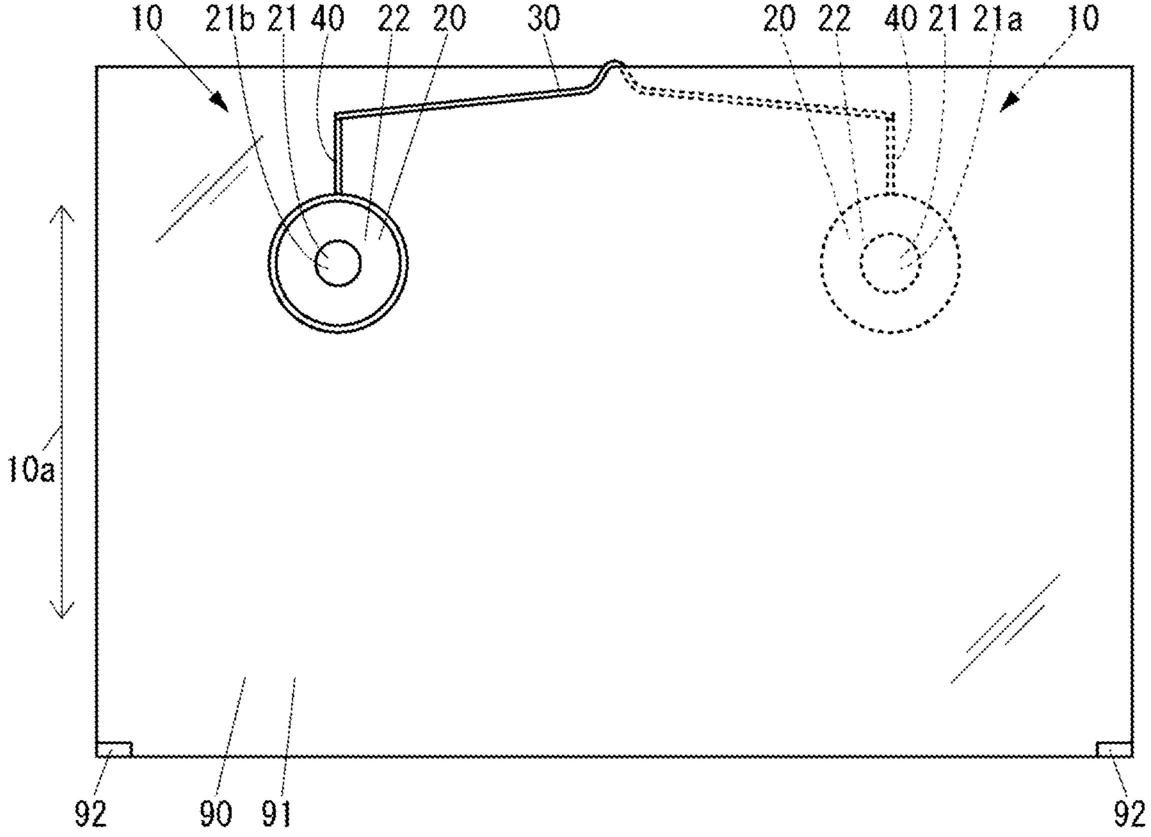
FIG. 8B is a front view of the partition, in a state where the two voice augmentation devices according to an embodiment of the present invention are attached, in which a mounting part and a coupling part are formed of a string-like member.

In the example shown in FIG. 8B, the string-like mounting part 30 is shared by the two voice augmentation devices 10, and formed of a wire. The mounting part 30 shown in FIG. 8B is mounted on the droplet suppressing member 91 in a state of being in contact with a portion of the droplet suppressing member 91 on which the mounting part 30 itself is mounted from above in a vertical direction.

Figure 9:
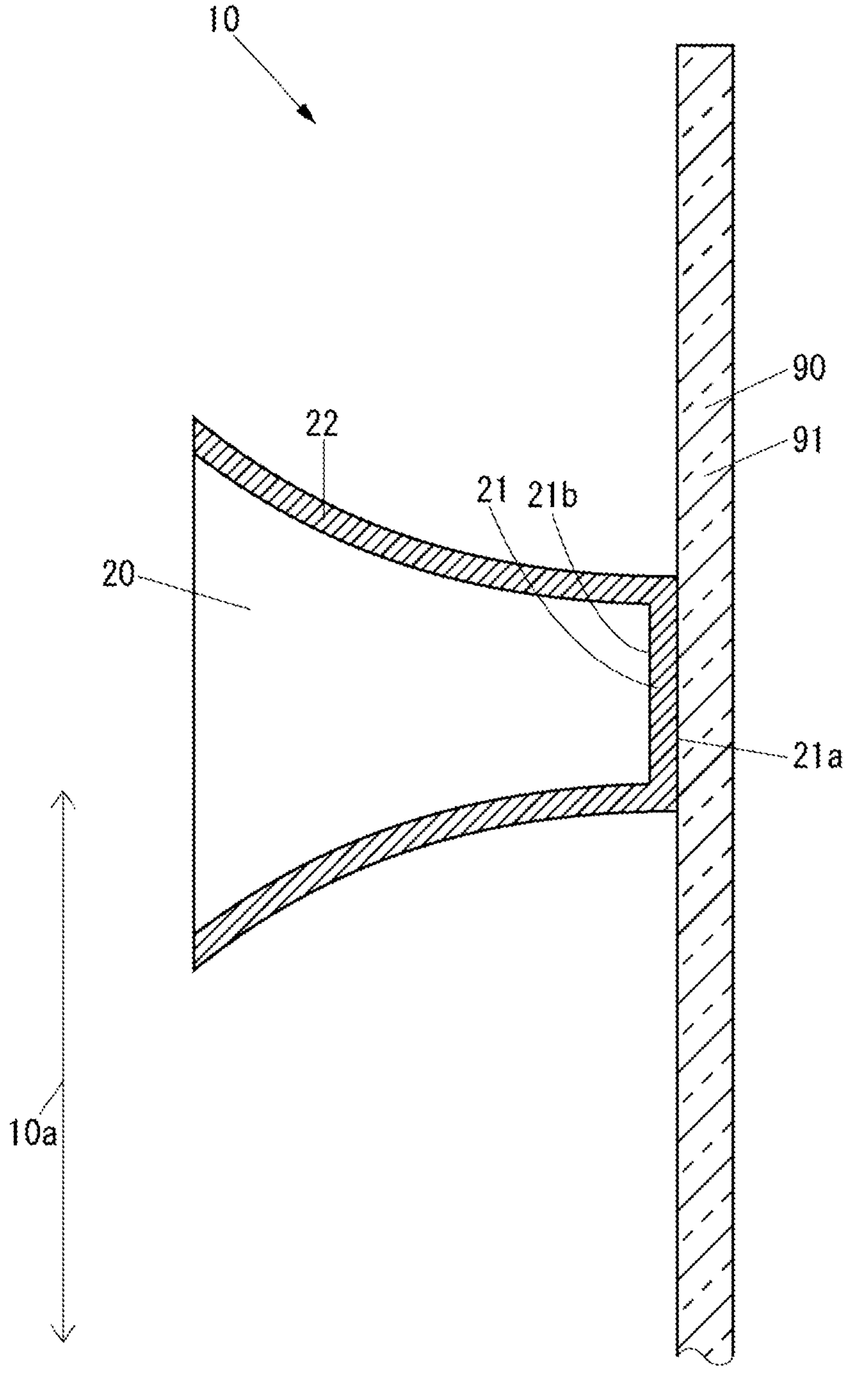
FIG. 9 is a side sectional view of a part of the partition in a state where the voice augmentation device according to an embodiment of the present invention is attached without including a mounting part and a coupling part.

FIG. 9 is a side sectional view of a part of the partition 90 in a state where the voice augmentation device 10 not including the mounting part 30 and the coupling part 40 is attached.

The voice augmentation device 10 is disposed at a specific position with respect to the droplet suppressing member 91 by mounting the mounting part 30 on the droplet suppressing member 91 in FIG. 1, but may be disposed at a specific position with respect to the droplet suppressing member 91 by a method other than a method in which the mounting part 30 is mounted on the droplet suppressing member 91. For example, the voice augmentation device 10 may be attached to the droplet suppressing member 91 by pasting the base vibration input part 21*a* to the droplet suppressing member 91 with an adhesive such as a double-sided tape as shown in FIG. 9 without including the mounting part 30 and the coupling part 40. The voice augmentation device 10 may be attached to the droplet suppressing member 91 by fixing the main body 20 to the droplet suppressing member 91 with, for example, a screw without including the mounting part 30 and the coupling part 40.

Figure 10:
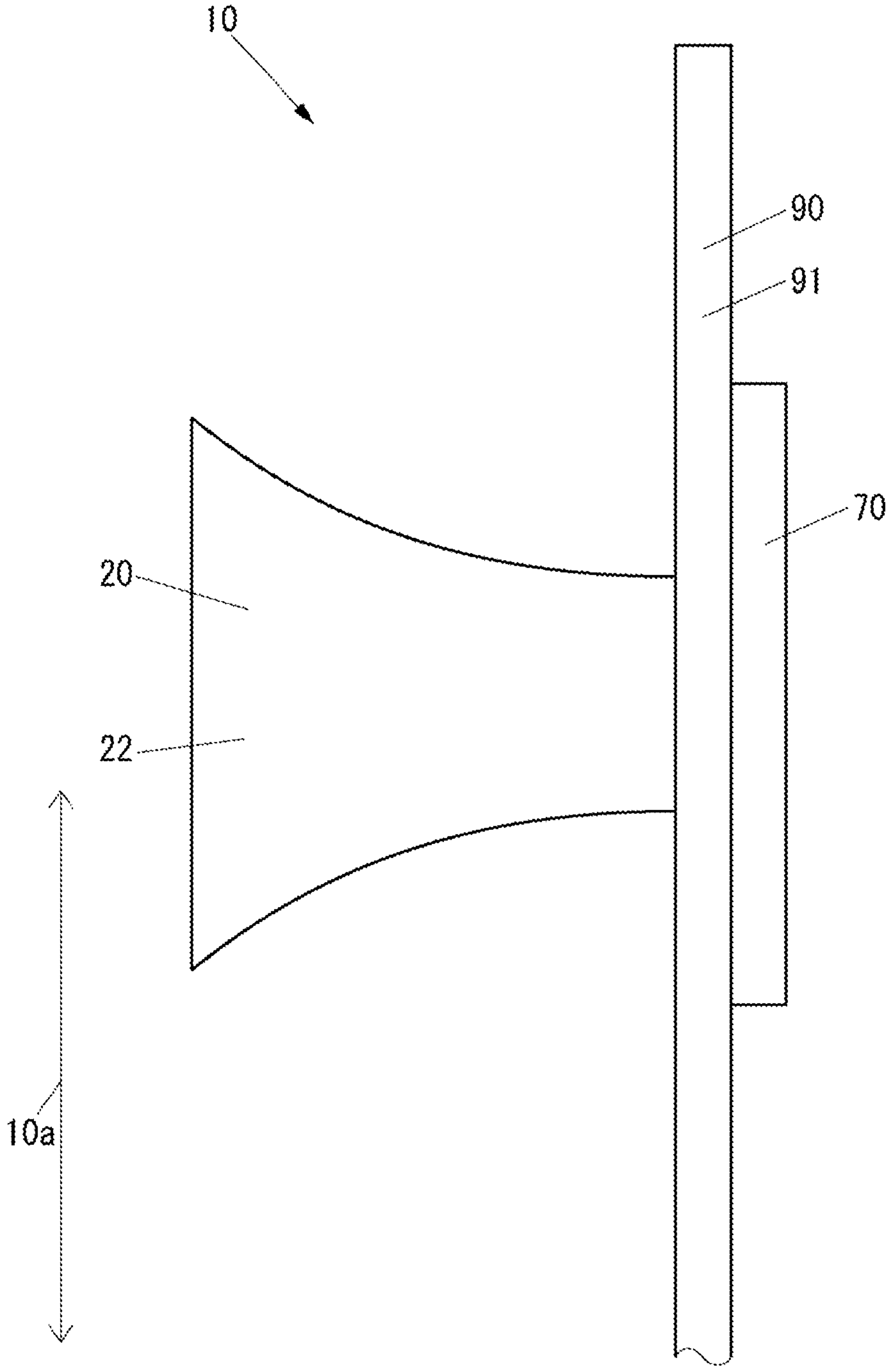
FIG. 10 is a side view of a part of the partition in a state where the voice augmentation device according to an embodiment of the present invention including a resonating member is attached.

FIG. 10 is a side view of a part of the partition 90 in a state Where the voice augmentation device 10 including a resonating member 70 is attached.

As shown in FIG. 10, the voice augmentation device 10 may include a resonating member 70 resonating a portion of the voice augmentation device 10 on the side of the listener with respect to the droplet suppressing member 91. In the example shown in FIG. 10, a portion of the voice augmentation device 10 on the side of the listener with respect to the droplet suppressing member 91 is the main body 20. The resonating member 70 is disposed on the side of the speaker with respect to the droplet suppressing member 91 when the voice augmentation device 10 is attached to the droplet suppressing member 91. The resonating member 70 may be pasted to the droplet suppressing member 91 with an adhesive such as a double-sided tape. The resonating member 70 may be formed of, for example, a material such as wood, metal, or plastic. In the example shown in FIG. 10, the mass and rigidity and the like of the resonating member 70 are determined so as to have the same natural frequency as the natural frequency of the main body 20. The resonating member 70 is preferably disposed at a position facing a portion of the voice augmentation device 10 on the side of the listener with respect to the droplet suppressing member 91 with the droplet suppressing member 91 therebetween. When the voice augmentation device 10 includes the resonating, member 70, the resonating member 70 receives the vibration of the voice of the speaker from the air on the side of the speaker with respect to the droplet suppressing member 91, and the resonating member 70 resonates the portion of the voice augmentation device 10 on the side of the listener with respect to the droplet suppressing member 91, so that the vibration of the voice of the speaker transmitted by the base vibration output part 21*b* to the air on the side of the listener with respect to the base vibration output part 21*b* itself can be augmented. Therefore, when the voice augmentation device 10 includes the resonating member 70, the voice of the speaker transmitted to the listener can be augmented, and as a result, the voice of the speaker can be more easily heard by the listener.

Figure 11A:
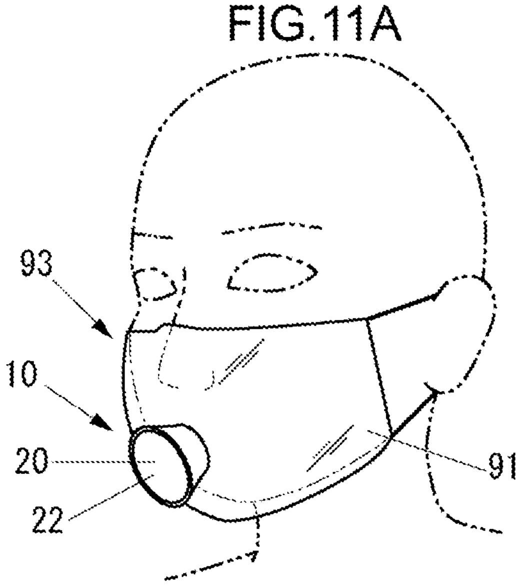
FIG. 11A is a perspective view of the voice augmentation device shown in FIG. 9 in a state of being attached to a mask-type droplet suppressing member.
Figure 11B:
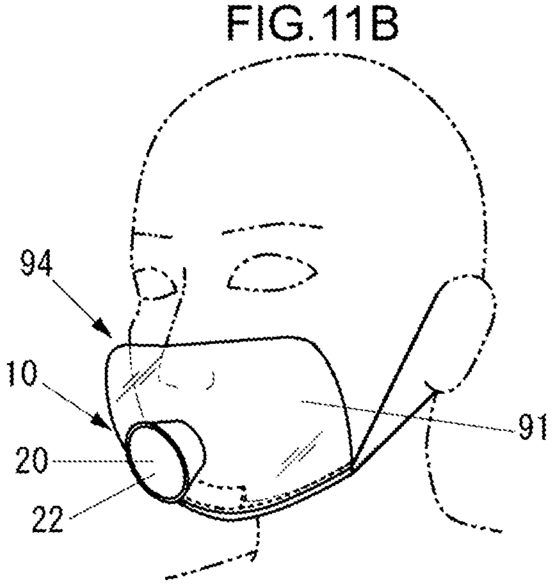
FIG. 11B is a perspective view of the voice augmentation device shown in FIG. 9 in a state of being attached to a mouth shield-type droplet suppressing member.
Figure 11C:
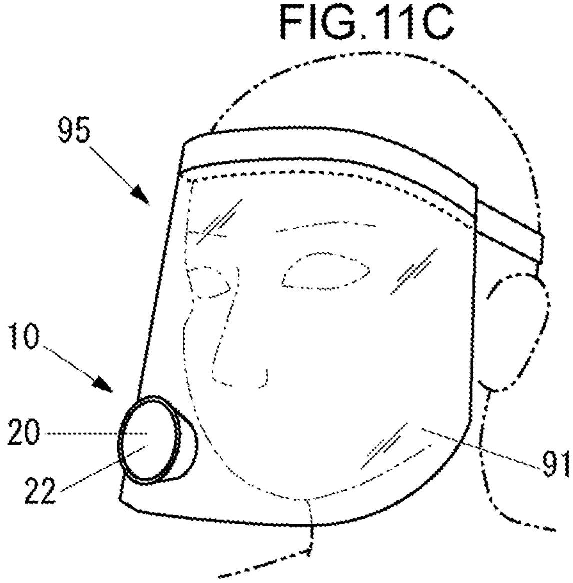
FIG. 11C is a perspective view of the voice augmentation device shown in FIG. 9 in a state of being attached to a face shield-type droplet suppressing member.

FIG. 11A is a perspective view of the voice augmentation device 10 shown in FIG. 9 in a state of being attached to a mask-type droplet suppressing member 91. FIG. 11B is a perspective view of the voice augmentation device 10 shown in FIG. 9 in a state of being attached to a mouth shield-type droplet suppressing member 91. FIG. 11C is a perspective view of the voice augmentation device 10 shown in FIG. 9 in a state of being attached to a face shield-type droplet suppressing member 91.

In the partition 90 as shown in FIG. 1, the droplet suppressing member 91 is placed at the front of the speaker at a place slightly away from the speaker. However, the droplet suppressing member 91 may be disposed between the speaker and the listener by being worn on the speaker as shown in FIGS. 11A to 11C, for example. Each of a mask 93 shown in 11A, a mouth shield 94 shown in FIG. 11B, and a face shield 95 shown in FIG. 11C includes the droplet suppressing member 91 for suppressing droplet generated from at least one of the mouth and nose of the speaker.

In FIGS. 11A to 11C, the voice augmentation device 10 is pasted to the droplet suppressing member 91 to be disposed at a specific position with respect to the droplet suppressing member 91. However, when the voice augmentation device 10 is attached to the mask 93, the mouth shield 94, and the face shield 95, the voice augmentation device 10 may be disposed at a specific position with respect to the droplet suppressing member 91 by a method other than a method in which the voice augmentation device 10 is pasted to the droplet suppressing member 91. For example, the voice augmentation device 10 may be attached to the mask 93, the mouth shield 94, and the face shield 95 by mounting the mounting part 30 on the droplet suppressing member 91 as shown in FIG. 1.

In the above description, acrylic is exemplified as the material of the droplet suppressing member 91, but the droplet suppressing member 91 may be formed of a material other than acrylic. For example, the droplet suppressing member 91 can be formed of various materials such as a cloth other than a nonwoven fabric (such as a cotton woven fabric), a nonwoven fabric, polyurethane, and vinyl.

What is claimed is:

1. A voice augmentation device comprising:

a vibration input part receiving vibration of a voice of a speaker from at least one of a droplet suppressing member disposed between the speaker and a listener in order to suppress droplet generated from at least one of a mouth and nose of the speaker and air between the droplet suppressing member and the vibration input part; and a vibration output part transmitting the vibration of the voice received by the vibration input part to air on a side of the listener with respect to the vibration output part, wherein the voice augmentation device is disposed at a specific position with respect to the droplet suppressing member to augment the voice of the speaker transmitted to the listener, the vibration input part is a solid portion receiving the vibration of the voice from at least one of the droplet suppressing member and the air between the droplet suppressing member and the vibration input part, the vibration output part is a solid portion transmitting the vibration of the voice received by the vibration input part to the air on the side of the listener with respect to the vibration output part, and the voice augmentation device transmits the voice from the vibration input part to the vibration output part as vibration transmitted in a solid.

2. The voice augmentation device according to claim 1, further comprising a resonating member disposed on a side of the speaker with respect to the droplet suppressing member when the voice augmentation device is disposed at the specific position with respect to the droplet suppressing member, to resonate a portion of the voice augmentation device on a side of the listener with respect to the droplet suppressing member, wherein the vibration output part is disposed on the side of the listener with respect to the droplet suppressing member when the voice augmentation device is disposed at the specific position with respect to the droplet suppressing member.

3. The voice augmentation device according to claim 2, further comprising a mounting part mounted on the droplet suppressing member, wherein the mounting part is mounted on the droplet suppressing member so that the voice augmentation device is disposed at the specific position with respect to the droplet suppressing member.

4. The voice augmentation device according to claim 3, further comprising a coupling part coupling the vibration output part and the mounting part, wherein the coupling part has a variable length in a vertical direction when the voice augmentation device is disposed at the specific position with respect to the droplet suppressing member.

5. The voice augmentation device according to claim 1, further comprising a mounting part mounted on the droplet suppressing member, wherein the mounting part is mounted on the droplet suppressing member so that the voice augmentation device is disposed at the specific position with respect to the droplet suppressing member.

6. The voice augmentation device according to claim 5, further comprising a coupling part coupling the vibration output part and the mounting part, wherein the coupling part has a variable length in a vertical direction when the voice augmentation device is disposed at the specific position with respect to the droplet suppressing member.

7. The voice augmentation device according to claim 5, wherein the mounting part is mounted on the droplet suppressing member in a state of being in contact with a portion of the droplet suppressing member on which the mounting part itself is mounted from above in a vertical direction.

8. The voice augmentation device according to claim 1, further comprising an additional input part as a solid portion disposed on a side of the speaker with respect to the droplet suppressing member to receive the vibration of the voice from air on the side of the speaker with respect to the droplet suppressing member, wherein the vibration output part transmits the vibration of the voice received by the vibration input part and the vibration of the voice received by the additional input part to the air on the side of the listener with respect to the vibration output part, and the voice augmentation device transmits the voice from the vibration input part and the additional input part to the vibration output part as the vibration transmitted in a solid.

9. The voice augmentation device according to claim 1, further comprising a loudspeaker augmenting the voice output by the vibration output part, wherein the loudspeaker includes:

a microphone to which the voice output by the vibration output part is input;

an amplifier amplifying an output signal of the microphone; and a speaker outputting a voice according to an output signal of the amplifier.

10. The voice augmentation device according to claim 1, further comprising a directivity imparting part imparting directivity to the voice output by the vibration output part to augment the voice transmitted to the listener.

11. The voice augmentation device according to claim 1, further comprising:

a mounting part mounted on the droplet suppressing member; and a coupling part coupling the vibration output part and the mounting part, wherein the mounting part is mounted on the droplet suppressing member so that the voice augmentation device is disposed at the specific position with respect to the droplet suppressing member, and the coupling part has a variable length in a vertical direction when the voice augmentation device is disposed at the specific position with respect to the droplet suppressing member.

12. A partition comprising:

a voice augmentation device disposed at a specific position with respect to a droplet suppressing member disposed between a speaker and a listener in order to suppress droplet generated from at least one of a mouth and nose of the speaker, to augment a voice of the speaker transmitted to the listener; and the droplet suppressing member, wherein the voice augmentation device includes:

a vibration input part receiving vibration of the voice from at least one of the droplet suppressing member and air between the droplet suppressing member and the vibration input part; and a vibration output part transmitting the vibration of the voice received by the vibration input part to air on a side of the listener with respect to the vibration output part, wherein the vibration input part is a solid portion receiving the vibration of the voice from at least one of the droplet suppressing member and the air between the droplet suppressing member and the vibration input part, the vibration output part is a solid portion transmitting the vibration of the voice received by the vibration input part to the air on the side of the listener with respect to the vibration output part, and the voice augmentation device transmits the voice from the vibration input part to the vibration output part as vibration transmitted in a solid.

13. A mask comprising:

a voice augmentation device disposed at a specific position with respect to a droplet suppressing member disposed between a speaker and a listener in order to suppress droplet generated from at least one of a mouth and nose of the speaker, to augment a voice of the speaker transmitted to the listener; and the droplet suppressing member, wherein the voice augmentation device includes:

a vibration input part receiving vibration of the voice from at least one of the droplet suppressing member and air between the droplet suppressing member and the vibration input part; and a vibration output part transmitting the vibration of the voice received by the vibration input part to air on a side of the listener with respect to the vibration output part, wherein the vibration input part is a solid portion receiving the vibration of the voice from at least one of the droplet suppressing member and the air between the droplet suppressing member and the vibration input part, the vibration output part is a solid portion transmitting the vibration of the voice received by the vibration input part to the air on the side of the listener with respect to the vibration output part, and the voice augmentation device transmits the voice from the vibration input part to the vibration output part as vibration transmitted in a solid.

14. A mouth shield comprising:

a voice augmentation device disposed at a specific position with respect to a droplet suppressing member disposed between a speaker and a listener in order to suppress droplet generated from at least one of a mouth and nose of the speaker, to augment a voice of the speaker transmitted to the listener; and the droplet suppressing member, wherein the voice augmentation device includes:

a vibration input part receiving vibration of the voice from at least one of the droplet suppressing member and air between the droplet suppressing member and the vibration input part; and a vibration output part transmitting the vibration of the voice received by the vibration input part to air on a side of the listener with respect to the vibration output part, wherein the vibration input part is a solid portion receiving the vibration of the voice from at least one of the droplet suppressing member and the air between the droplet suppressing member and the vibration input part, the vibration output part is a solid portion transmitting the vibration of the voice received by the vibration input part to the air on the side of the listener with respect to the vibration output part, and the voice augmentation device transmits the voice from the vibration input part to the vibration output part as vibration transmitted in a solid.

15. A face shield comprising:

a voice augmentation device disposed at a specific position with respect to a droplet suppressing member disposed between a speaker and a listener in order to suppress droplet generated from at least one of a mouth and nose of the speaker, to augment a voice of the speaker transmitted to the listener; and the droplet suppressing member, wherein the voice augmentation device includes:

a vibration input part receiving vibration of the voice from at least one of the droplet suppressing member and air between the droplet suppressing member and the vibration input part; and a vibration output part transmitting the vibration of the voice received by the vibration input part to air on a side of the listener with respect to the vibration output part, wherein the vibration input part is a solid portion receiving the vibration of the voice from at least one of the droplet suppressing member and the air between the droplet suppressing member and the vibration input part, the vibration output part is a solid portion transmitting the vibration of the voice received by the vibration input part to the air on the side of the listener with respect to the vibration output part, and the voice augmentation device transmits the voice from the vibration input part to the vibration output part as vibration transmitted in a solid.

* * * * *